(12) United States Patent
Ruiz et al.

(10) Patent No.: US 7,881,614 B2
(45) Date of Patent: Feb. 1, 2011

(54) OPTICALLY CONNECTING COMPUTER COMPONENTS

(75) Inventors: Everardo D. Ruiz, Beaverton, OR (US);
James Akiyama, Beaverton, OR (US);
Tom Willis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 11/026,667

(22) Filed: Dec. 31, 2004

(65) Prior Publication Data

US 2006/0147214 A1 Jul. 6, 2006

(51) Int. Cl.
*H04B 10/00* (2006.01)
(52) U.S. Cl. ........................ 398/128; 398/129; 398/130; 398/131; 398/135; 398/138; 398/156
(58) Field of Classification Search ................ 398/107, 398/118, 128–141, 154, 164; 235/454; 345/8, 345/204; 359/245; 710/1, 303; 708/131
See application file for complete search history.

(56) References Cited

U.S. PATENT DOCUMENTS

| | | | | |
|---|---|---|---|---|
| 5,184,314 | A * | 2/1993 | Kelly et al. ................. | 708/131 |
| 5,864,708 | A * | 1/1999 | Croft et al. ................... | 710/1 |
| 5,877,882 | A * | 3/1999 | Green et al. ................ | 398/164 |
| 6,236,486 | B1 * | 5/2001 | Nocker, IV ................. | 398/129 |
| 6,446,867 | B1 * | 9/2002 | Sanchez ..................... | 235/454 |
| 6,502,997 | B1 | 1/2003 | Lee et al. | |
| 6,584,533 | B1 * | 6/2003 | Cho et al. ................... | 710/303 |
| 6,654,826 | B1 * | 11/2003 | Cho et al. ................... | 710/62 |
| 6,943,755 | B1 * | 9/2005 | Bartow ........................ | 345/8 |
| 7,028,128 | B2 * | 4/2006 | Zhang et al. ................ | 710/305 |
| 2002/0063933 | A1 * | 5/2002 | Maeda et al. ............... | 359/173 |
| 2003/0034963 | A1 * | 2/2003 | Moon et al. ................. | 345/204 |
| 2003/0113071 | A1 * | 6/2003 | Kim et al. ................... | 385/76 |
| 2003/0113077 | A1 * | 6/2003 | Xu et al. ..................... | 385/93 |
| 2003/0113078 | A1 | 6/2003 | Tatum | |
| 2003/0138219 | A1 * | 7/2003 | O'Toole et al. ............. | 385/92 |
| 2003/0145148 | A1 | 7/2003 | Zhang et al. | |
| 2004/0066620 | A1 * | 4/2004 | Grunow et al. ............. | 361/686 |
| 2004/0120720 | A1 * | 6/2004 | Chang et al. ............... | 398/139 |

(Continued)

FOREIGN PATENT DOCUMENTS

JP      07-210644      8/1995

(Continued)

OTHER PUBLICATIONS

PCT/US2005/047342—International Search Report and Written Opinion, dated May 3, 2006.

(Continued)

*Primary Examiner*—Li Liu
(74) *Attorney, Agent, or Firm*—Blakely, Sokoloff, Taylor & Zafman LLP

(57) ABSTRACT

A central component of a processor based system, the central component including a processor and an optical interface to transmit data encoded as an optical signal to an optical interface of an external component of the processor based system, and to receive data encoded as an optical signal from the optical interface of the external component, the external component being one or more of an external peripheral device, a docking station, and a port replicator.

24 Claims, 3 Drawing Sheets

U.S. PATENT DOCUMENTS

2004/0141751 A1* 7/2004 Young .................. 398/107
2004/0263941 A1* 12/2004 Chen et al. .................. 359/245

FOREIGN PATENT DOCUMENTS

| JP | 2000-098180 | 4/2000 |
|---|---|---|
| JP | 2000-163171 | 6/2000 |
| JP | 2002-366340 | 12/2002 |
| JP | 2003-519459 | 6/2003 |
| JP | 2004-236308 | 8/2004 |
| JP | 2004-288674 | 10/2004 |
| JP | 2005-535271 | 11/2005 |
| WO | WO 93/08654 | 4/1993 |
| WO | WO 01/50170 | 7/2001 |
| WO | WO 2004/013991 | 2/2004 |

OTHER PUBLICATIONS

PCT/US2005/047342—International Preliminary Report on Patentability and Written Opinion, dated Jul. 3, 2007.

European Office Action mailed Oct. 8, 2007, European Application No. 05 855 412.2 (should be Application No. 05 855 837.0), filed Dec. 28, 2005.

European Office Action mailed Feb. 26, 2009, European Application No. 05 855 837.0, filed Dec. 28, 2005.

Japanese Notice of Reasons for Refusal, Japanese Patent Application 2007-549609, dated Mar. 23, 2010, 4 pages.

Japanese Decision of Final Refusal, Japanese Patent Application 2007-549609, dated Sep. 3, 2010, 6 pages.

* cited by examiner

US 7,881,614 B2

OPTICALLY CONNECTING COMPUTER COMPONENTS

BACKGROUND

Portable processor-based systems including laptop computers (laptops), also termed notebook computers, and hand held computers such as personal digital assistants (PDAs) or "smart" mobile telephones (devices integrating PDA and mobile phone functionality) are popular. Such devices are sometimes designed to trade off capability for portability, for example, a laptop computer may not include an integrated CD or DVD reader, but allow connection to one using a cable connector of an external bus, or via a docking station or a port replicator. Similarly, a laptop display is generally small in size and may be limited in brightness and resolution, but the laptop may be connected to an external display using for example a Digital Video Interface (DVI) connector, as specified in the *DVI* 1.0 *Specification* available from the Digital Display Working Group (DDWG) or Video Graphics Array (VGA) connector, well known in the art, on the laptop and a video signal cable. As is known, a docking station is a device that mechanically and electrically couples with a laptop to provide additional functionality, including, for example, additional external ports and drives for removable media. Docking stations may also be referred to as port replicators; alternatively, the term port replicator may also be used to refer to a docking station with limited functionality. Similarly a PDA or smart phone may come with no hardware keyboard, but may be connected to one using a cable connector of an external bus or a docking station designed for the PDA or smart phone.

Cable connection to external peripherals for a laptop is limited because such cables are limited in length by the physical parameters of their construction and the nature of the signals they carry, especially for cables that carry high bandwidth signals such as video or high speed data such as that specified in the *Universal Serial Bus Revision* 2.0 *Specification* (USB 2.0) available from the USB Implementers Forum or that specified in the several IEEE 1394 specifications available from the 1394 Trade Association cables (FireWire). Docking stations are often expensive because they require connectivity to a system bus of the laptop or hand held computer and may have large, multi-pin electrical connectors that are complex and use expensive precision-manufactured parts.

DETAILED DESCRIPTION

Figure 1:
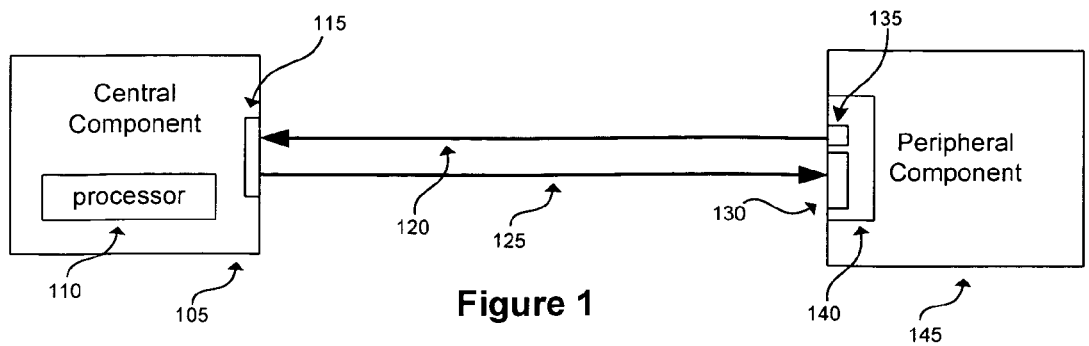
FIG. 1 depicts a central component and a peripheral component of a processor based-system that communicate data via optical interfaces in one embodiment.

In FIG. 1, an embodiment depicting one possible connection scheme between two components of a processor-based system is depicted. The first component, 105, is a central or base component and includes a processor of the system. For example, the component 105 may be the "CPU" unit of a personal computer (PC) that includes the mainboard; it may in other embodiments be a laptop, or a server computer, or another component in a processor-based system that contains a processor of the system. This component communicates with an external peripheral component 145 using optical data transmitted from the central component and received at 125 by the peripheral or transmitted from the peripheral and received by the central component, 120. The transmission may be over one or more optical fibers comprising an optical cable in some embodiments, or over another waveguide, or via any optical path through an optically transmissive medium such as air, vacuum, or glass in other embodiments. The data 120 and 125 may travel via fiber or another optical waveguide along part of its transmission and along another type of waveguide or another optical path such as through air, vacuum, or glass along another part of its transmission. Of course, components 105 and 145 may also separately be connected by other means such as by electrical or radio frequency links.

Each of the components has means for interfacing with the optical data transmitted and received by the component. In the depicted embodiment, the central component has an optical transceiver 115 and the peripheral component has a separate optical receiver 130 and a separate optical transmitter 135. In other embodiments the central component may have a separate transmitter and receiver and the peripheral may have a transceiver; or both components may have transceivers; or both components may have separate transmitters and receivers. Furthermore, while one pair of optical communication paths is shown in the figure, in other components there may be a plurality of optical connections or optically implemented communication channels between the two components in other embodiments. In other embodiments, the two components may be connected by a path for optical data traveling in only one direction, i.e. with only a transmitter on one component and only a receiver on the other. As one in the art will appreciate, many other configurations are possible.

Figure 2:
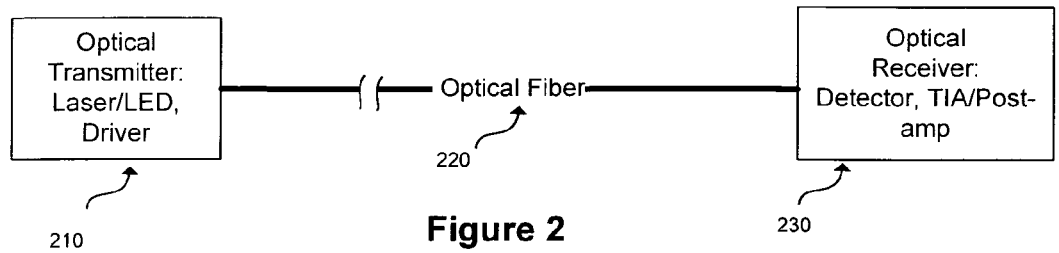
FIG. 2 depicts an optical transmitter and an optical receiver connected by an optical fiber in one embodiment.

An optical transmitter receiver pair such as that referenced above is depicted in FIG. 2. An optical transmitter 210 may be a laser emitter, implemented in some embodiments as a vertical cavity surface emitting laser (VCSEL), or alternatively in some embodiments a light emitting diode (LED) capable of being switched at a high frequency implemented as part of a circuit. An optical receiver may include for one instance a p-i-n or PIN diode or in another instance an Avalanche Photo Diode (APD) detector component and circuit and further a trans-impedance amplifer/post amplifier (TIA/Post-amp) circuit as at 230 in FIG. 2 in some embodiments. The transmitter and receiver are shown connected by an optical fiber 220 in the figure. As noted, other media, and combinations of fiber and other media, including an optical path through a optically transmissive medium, may also be used between the optical transmitter and optical receiver in some embodiments.

Figure 3:
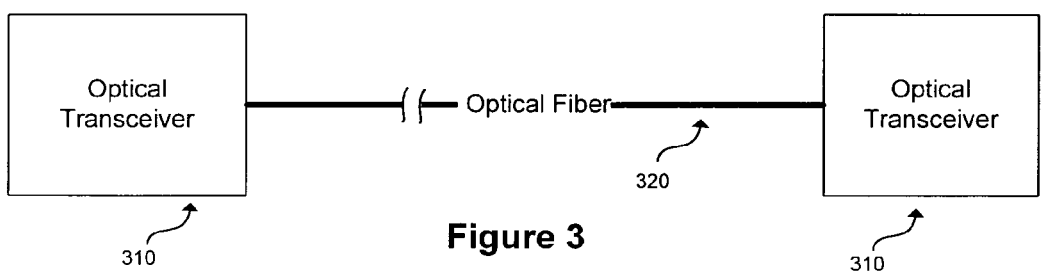
FIG. 3 depicts two optical transceivers connected by an optical fiber in one embodiment.

In other embodiments, an optical transmitter and receiver may be integrated into a single circuit or integrated circuit as shown abstractly in FIG. 3, to form optical transceivers 310. The circuit may contain a laser emitter such as a VCSEL or Fabry-Perot laser, or an LED emitter, and a detector or receiver such as a PIN diode and associated sub-circuits such as a TIA/Post-amp circuit. The transceivers are shown connected by optical fiber 320 in the figure. Again, other media and combinations of fiber and other media including an optical path through a optically transmissive medium may also be used between the optical transmitter and optical receiver in some embodiments.

Figure 4:
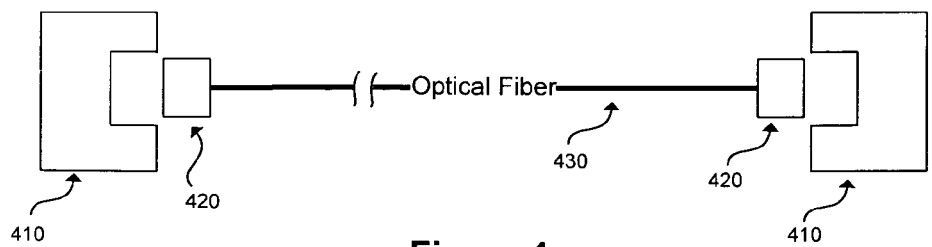
FIG. 4 depicts two optical plug and socket pairs connected by an optical fiber in one embodiment.

When an optical fiber is used to transmit optically encoded data between a transmitter and a receiver or between transceivers as in FIGS. 2 and 3, the fiber, as shown in FIG. 4 at 430, may be integrated into a cable assembly which may have at each end a plug 420. As depicted in the figure, plug 420 may mate with a socket 410, allowing for an optical coupling of optical data traveling between the socket and the fiber, and between the fiber and the socket. In the figure, an embodiment is shown with a plug and socket arrangement at each end. Of course, the plug may either be a "male" or "female" plug, and similarly the corresponding socket may be either a "female" or "male" socket in different embodiments as is known in the art. In other embodiments, one of the ends of the fiber may be integrated directly into a device without an intervening plug and socket arrangement.

The plug and socket 420 and 410 of FIG. 4 may implement an optical transceiver as previously described with reference to in FIG. 3 in some embodiments, or an optical transmitter or receiver as previously described with reference to FIG. 2 in others. If an optical fiber 430 has a plug and socket at each end, the plug and socket at one end is functionally related to the other. Thus, if the plug and socket combination 420 and 410 at one end of the fiber forms a transceiver, then the other plug and socket combination at the distal end is also a transceiver. If one plug and socket pair forms a transmitter, the other plug and socket pair must be a receiver.

In one embodiment the plug and socket 420 and 410 may be implemented as a VCSEL plastic optical link (VPOL) plug and socket, formed by a molded lead frame, including a metal lead frame and a molded precision plastic component comprising a waveguiding and lensing assembly, for example, a mirror and lens assembly and an integrated circuit providing VCSEL functionality, the detector sensor, and the detector circuit. Such an embodiment is further described in U.S. patent application Ser. No. 10/955,809 filed by Brian K. Kim et. al. and assigned to Intel Corporation In one embodiment, the plug and socket 420 and 410 may each be connected to a device and provide for direct optical transmission from one device to another through air or vacuum, without an optical fiber or other waveguide intervening. For instance, as shown in FIG. 5, a docking connector for a laptop docking station may be implemented by a plug and socket arrangement similar to the arrangement shown in FIG. 4.

Figure 5:
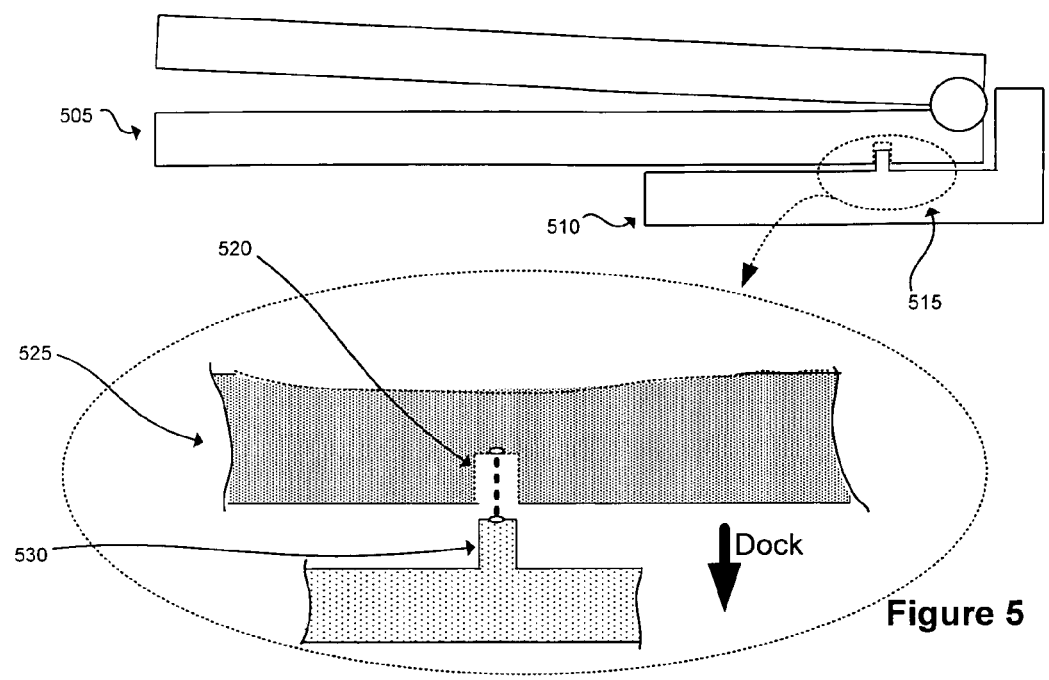
FIG. 5 depicts a block diagram of a laptop docking connection in one embodiment.

In FIG. 5, a laptop 505 is shown with a docking station 510. In this embodiment, at least part of the data communication between the laptop and docking station takes place using an optical plug and socket arrangement 515. The optical plug and socket may in one embodiment be constructed as shown at 520 and 530, with the socket integrated into the base of the laptop 525 and the plug integrated into the mating surface of the docking station at 530. When properly mated the optical transceivers in the plug 530 and 520 may align and communicate optically through the air and allow data communication between the laptop 505 and docking station 510. In some embodiments, there may additionally be electrical connectivity also provided between the docking station 510 and laptop 505 to allow power and in some embodiments, some data as well to flow electrically between the devices. In other embodiments, the plug and socket arrangement to couple the laptop and docking station may include an intermediate waveguide such as an optical fiber.

Figure 6:
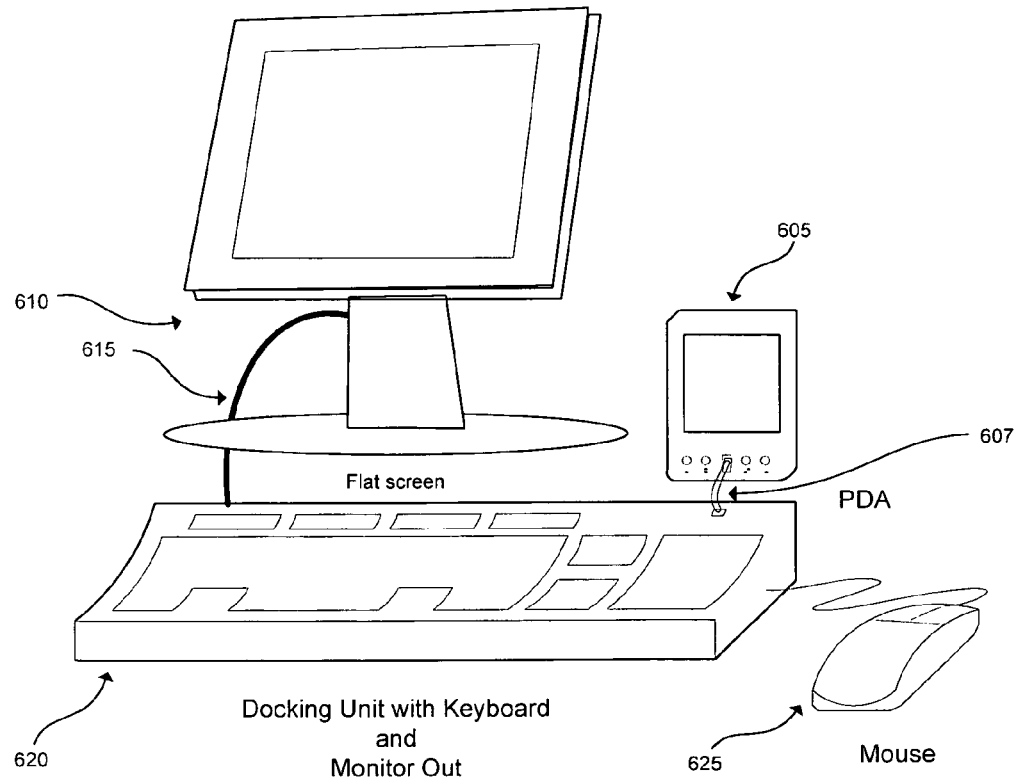
FIG. 6 depicts a docking station for a PDA in one embodiment.

An arrangement allowing docking of a PDA or other hand held portable processor based device is shown in FIG. 6. In this embodiment, a PDA 605 may be connected to a docking system. The docking system may include a keyboard portion 620 and a monitor output to connect via connector 615 an external monitor 610 and a mouse 625 to the docking system. Such a system may provide compact connectivity between the PDA and the docking system using an optical connector 607. This connector may be an optical fiber cable or other waveguide with plug connectors at both ends such as that described in FIG. 4 and with corresponding sockets in the docking unit 620 and PDA 605. Alternately, it may be an optical fiber cable integrated into the docking station with a plug at one end and a corresponding socket in the PDA.

Figure 7:
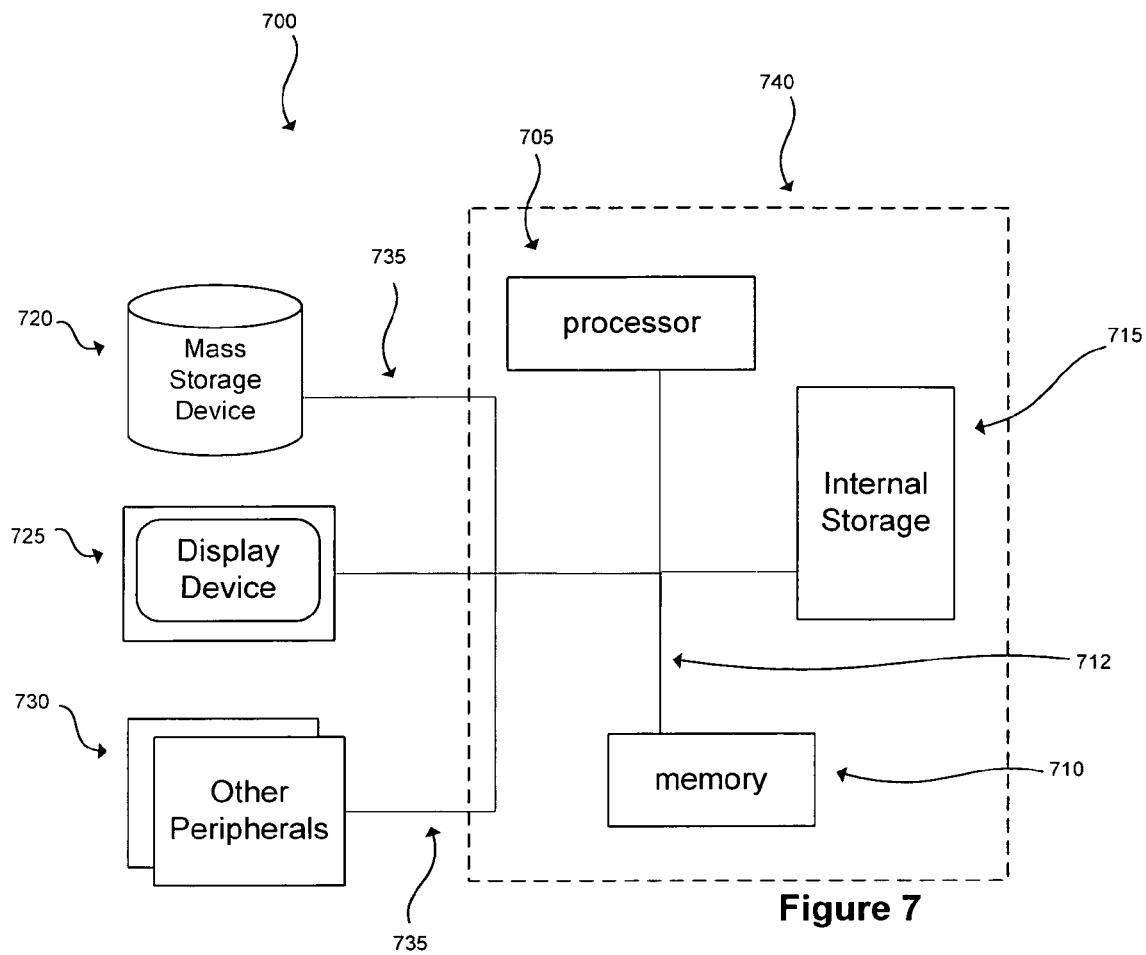
FIG. 7 depicts a processor-based system in one embodiment.

Many such connectivity solutions using an optical connector system may be implemented by one skilled in the art. In general, as shown in FIG. 7, embodiments may be part of a general processor based system 700. The system shown includes a processor 705, a bus 712 communicatively coupling the processor to a memory 710 and other internal storage 715 such as a hard drive. Such a system may be a desktop PC, laptop, server computer, other computer, a personal digital assistant, smartphone, entertainment device such as a game console, or another processor based device. In the embodiment depicted, the device is connectible to external peripherals 720, 725, and 730, which may be one or more of several types of devices. One type of peripheral device connectible to the system may be a mass storage device 720 which may be, for example, a disk drive such as a CD or DVD storage drive, a hard disk drive, a non-volatile memory store such as a flash memory based storage device, among many others, as is known in the art. Alternatively, a peripheral may be a display device 725 such as a cathode ray tube (CRT) or liquid crystal display (LCD) or one of many other displays, as is known in the art. Many other peripherals 730 are similarly connectible to the system, for example, printers, plotters scanners, cameras, audio devices, and many more.

In a system connected to a display device 725 in some embodiments, a graphics processing unit (GPU) may be used to process data from the system 700 for display. In general, the interconnects 735 between the base component of the system 740 and the external peripherals may each be implemented as an optical data link in this embodiment, each of which may be an optical connector such as the ones described above. In some embodiments the interconnects 735 may additionally carry electrical power and electronic data over one or more wires. Thus, for example, in some embodiments, the links 735 may be optical fiber based cables with a plug and socket connector at one or either end; or docking connectors with plug and socket connectors that allow a peripheral to directly mechanically and optically mate with the system in others. Of course, many variations of the internal components, organization and peripherals shown in FIG. 7 are possible in differing embodiments.

In the preceding description, for purposes of explanation, numerous specific details are set forth in order to provide a thorough understanding of the described embodiments, however, one skilled in the art will appreciate that many other embodiments may be practiced without these specific details.

While the use of molded plastic, lead frame and metal components is described above relating to embodiments of an optical plug and connector, many other manufacturing techniques and materials may be used to provide optical interfaces for components.

In the description of the embodiments, reference may be made to accompanying drawings. In the drawings, like numerals describe substantially similar components throughout the several views. Other embodiments may be utilized and structural, logical, and electrical changes may be made.

Moreover, it is to be understood that the various embodiments, although different, are not necessarily mutually exclusive. For example, a particular feature, structure, or characteristic described in one embodiment may be included within other embodiments.

Further, a design of an embodiment may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided at least in part as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, FLASH memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. An apparatus comprising:
    a first component of a processor based system, the first component comprising:
    a processor; and
    a first optical interface to transmit data encoded as an optical signal to a second optical interface of a second component of the processor based system and to receive data encoded as an optical signal from the second optical interface of the second component, the second component comprising one or more of a docking station and a port replicator, wherein the first optical interface includes an optical socket integrated into the first component to mate with an optical plug included in a mating surface of the second component and wherein when the optical plug is mated to the optical socket the first optical interface is optically aligned with the second optical interface to communicate optically through air without an intervening optical fiber to allow data communication between the first and second components, and wherein the optical plug and optical socket are implemented as a vertical cavity surface emitting laser (VCSEL) plastic optical link (VPOL) plug and socket formed by a molded lead frame, wherein the molded lead frame includes a metal lead frame and a molded precision plastic component comprising an integrated circuit containing a vertical cavity surface emitting laser (VCSEL).

2. The apparatus of claim 1 wherein the first and second optical interface each respectively comprises at least one of the following:
    an optical transmitter;
    an optical receiver; and
    an optical transceiver.

3. The apparatus of claim 2 wherein the optical signal further comprises:
    an optical signal transmitted from one or more of a vertical cavity surface emitting laser (VCSEL) and a light emitting diode (LED) and received by one or more of a PIN diode; and
    an avalanche photo-diode (APD) detector.

4. The apparatus of claim 1 further comprising:
    an electrical link between the first and second component to provide at least one of electrical power to the first component; and
    an electrical data link between the components.

5. The apparatus of claim 3 wherein the first and second optical interfaces comprise a pair of mechanically and optically mating connectors which when mechanically and optically connected to each other form an optical path to carry data encoded as an optical signal between the interfaces.

6. The apparatus of claim 5 wherein the first component comprises a laptop computer and the second component comprises a docking station for the laptop computer.

7. The apparatus of claim 5 wherein the first component comprises a hand held computing device and the second component comprises a docking station for the hand held computing device.

8. The apparatus of claim 1, wherein the molded precision plastic component further comprises:
    a waveguiding and lensing assembly;
    a detector sensor; and
    a detector circuit.

9. An apparatus comprising:
    a first component of a processor based system, the first component comprising one or more of a docking station and a port replicator; and
    a first optical interface to transmit data encoded as an optical signal to a second optical interface of a second component of the processor based system, and to receive data encoded as an optical signal from the second optical interface of the second component, the second component comprising a processor, wherein the first optical interface includes an optical plug included in a mating surface of the first component to mate with an optical socket included in the second component and wherein when the optical plug is mated to the optical socket the first optical interface is optically aligned with the second optical interface to communicate optically through air without an intervening optical fiber to allow data communication between the first and second components, and wherein the optical plug and optical socket are implemented as a vertical cavity surface emitting laser (VCSEL) plastic optical link (VPOL) plug and socket formed by a molded lead frame, wherein the molded lead frame includes a metal lead frame and a molded precision plastic component comprising an integrated circuit containing a vertical cavity surface emitting laser (VCSEL).

10. The apparatus of claim 9 wherein the first and second optical interface each respectively comprises at least one of the following:
  an optical transmitter;
  an optical receiver; and
  an optical transceiver.

11. The apparatus of claim 10 wherein the optical signal further comprises:
  an optical signal, transmitted from one or more of a vertical cavity surface emitting laser (VCSEL) and a light emitting diode (LED) and received by one or more of a PIN diode; and
  an avalanche photo-diode (APD) detector.

12. The apparatus of claim 9 further comprising an electrical link between the first and second component to provide at least one of electrical power to the second component and an electrical data link between the components.

13. The apparatus of claim 11 wherein the first and second optical interfaces comprise a pair of mechanically and optically mating connectors which when mechanically and optically connected to each other form an optical path to carry data encoded as an optical signal between the interfaces.

14. The apparatus of claim 13 wherein the first component comprises a docking station for a laptop computer and the second component comprises the laptop computer.

15. The apparatus of claim 13 wherein the first component comprises a docking station for a hand held computing device and the second component comprises the hand held computing device.

16. The apparatus of claim 9, wherein the molded precision plastic component further comprises:
  a waveguiding and lensing assembly;
  a detector sensor; and
  a detector circuit.

17. A system comprising:
  a first component including a processor;
  a first optical interface of the first component to transmit data encoded as an optical signal to a second optical interface of a second component of the system and to receive data encoded as an optical signal from the second optical interface of the second component, the second component comprising one or more of a docking station and a port replicator, wherein the first optical interface includes an optical socket included in a mating surface of the first component to mate with an optical plug included in the second component and wherein when the optical plug is mated to the optical socket the first optical interface is optically aligned with the second optical interface to communicate optically through air without an intervening optical fiber to allow data communication between the first and second components, and wherein the optical plug and optical socket are implemented as a vertical cavity surface emitting laser (VCSEL) plastic optical link (VPOL) plug and socket formed by a molded lead frame, wherein the molded lead frame includes a metal lead frame and a molded precision plastic component comprising an integrated circuit containing a vertical cavity surface emitting laser (VCSEL); and
  the second component.

18. The system of claim 17 wherein the first and second optical interface each respectively comprises at least one of the following:
  an optical transmitter;
  an optical receiver; and
  an optical transceiver.

19. The system of claim 18 wherein the optical signal further comprises:
  an optical signal, transmitted from one or more of a vertical cavity surface emitting laser (VCSEL) and a light emitting diode (LED) and received by one or more of a PIN diode; and
  an avalanche photo-diode (APD) detector.

20. The system of claim 17, wherein the molded precision plastic component further comprises:
  a waveguiding and lensing assembly;
  a detector sensor; and
  a detector circuit.

21. A system, comprising:
  a laptop computer having an optical socket integrated into a base of the laptop; and
  a docking station having an optical plug integrated into a mating surface of the docking station, wherein when the optical plug is mated to the optical socket a first optical transceiver included in the optical plug is optically aligned with a second optical transceiver included in the optical socket to communicate optically through air without an intervening optical fiber to allow data communication between the laptop computer and the docking station, wherein the optical plug and optical socket are implemented as a vertical cavity surface emitting laser (VCSEL) plastic optical link (VPOL) plug and socket formed by a molded lead frame, wherein the molded lead frame includes a metal lead frame and a molded precision plastic component comprising an integrated circuit containing a vertical cavity surface emitting laser (VCSEL).

22. The system of claim 21, wherein the first optical transceiver includes a PIN diode to receive data encoded as an optical signal from the second optical transceiver.

23. The system of claim 21, wherein the first optical transceiver includes an avalanche photo-diode (APD) detector to receive data encoded as an optical signal from the second optical transceiver.

24. The system of claim 21, wherein the molded precision plastic component further comprises:
  a waveguiding and lensing assembly;
  a detector sensor; and
  a detector circuit.

* * * * *